(12) United States Patent
Li et al.

(10) Patent No.: US 10,298,713 B2
(45) Date of Patent: May 21, 2019

(54) DISTRIBUTED CONTENT DISCOVERY FOR IN-NETWORK CACHING

(71) Applicant: Huawei Technologies Co., Ltd., Shenzhen (CN)

(72) Inventors: Xu Li, Nepean (CA); Ngoc-Dung Dao, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 190 days.

(21) Appl. No.: 14/673,624

(22) Filed: Mar. 30, 2015

(65) Prior Publication Data

US 2016/0294971 A1   Oct. 6, 2016

(51) Int. Cl.
| H04L 29/08 | (2006.01) |
| H04L 12/24 | (2006.01) |
| H04L 12/26 | (2006.01) |

(52) U.S. Cl.
CPC ...... H04L 67/2842 (2013.01); H04L 41/0803 (2013.01); H04L 67/34 (2013.01); H04L 41/12 (2013.01); H04L 43/0876 (2013.01)

(58) Field of Classification Search
CPC . H04L 67/2842; H04L 41/0803; H04L 41/12; H04L 47/125; H04L 43/0876
See application file for complete search history.

(56) References Cited

U.S. PATENT DOCUMENTS

| 7,849,507 | B1* | 12/2010 | Bloch | H04L 12/2602 726/22 |
| 7,975,043 | B2* | 7/2011 | Douglas | H04L 29/06 709/224 |
| 8,255,557 | B2* | 8/2012 | Raciborski | G06F 17/30194 709/219 |
| 9,209,943 | B1* | 12/2015 | Firoiu | H04L 1/1607 |
| 9,860,335 | B2* | 1/2018 | Zhao | H04L 65/605 |
| 9,880,933 | B1* | 1/2018 | Gupta | G06F 12/0815 |

(Continued)

FOREIGN PATENT DOCUMENTS

| CN | 1499382 A | 5/2004 |
| CN | 102740159 A | 10/2012 |
| WO | 0244915 A1 | 6/2002 |

OTHER PUBLICATIONS

Alimi, R., et al, "A survey of In-Network Storage Systems," IETF RFC 6392, Oct. 2011, 44 pages.

*Primary Examiner* — Blake J Rubin
(74) *Attorney, Agent, or Firm* — Slater Matsil, LLP

(57) ABSTRACT

Network caching performance can be improved by allowing users to discover distributed cache locations storing content of a central content server. Specifically, retrieving the content from a distributed cache proximately located to the user, rather than from the central content server, may allow for faster content delivery, while also consuming fewer network resources. Content can be associated with distributed cache locations storing that content by cache location tables, which may be maintained at intermediate network nodes, such as border routers and other devices positioned in-between end-users and central content servers. Upon receiving a query, the intermediate network nodes may determine whether the content requested by the query is associated with a cache location in the cache location table, and if so, provide the user with a query response identifying the associated cache location.

25 Claims, 10 Drawing Sheets

(56) References Cited

U.S. PATENT DOCUMENTS

| | | | |
|---|---|---|---|
| 2002/0004846 A1* | 1/2002 | Garcia-Luna-Aceves | G06F 12/1483 709/245 |
| 2002/0009079 A1* | 1/2002 | Jungck | H04L 29/12066 370/389 |
| 2002/0143798 A1 | 10/2002 | Lisiecki et al. | |
| 2003/0187935 A1* | 10/2003 | Agarwalla | H04L 29/06 709/206 |
| 2003/0200307 A1* | 10/2003 | Raju | G06F 12/1483 709/224 |
| 2004/0172466 A1* | 9/2004 | Douglas | H04L 29/06 709/224 |
| 2007/0050491 A1* | 3/2007 | Kataoka | H04L 67/2814 709/223 |
| 2009/0113068 A1* | 4/2009 | Fujihira | H04L 63/08 709/231 |
| 2009/0262741 A1* | 10/2009 | Jungck | H04L 29/12066 370/392 |
| 2010/0054246 A1* | 3/2010 | Shah | H04L 12/1863 370/390 |
| 2010/0146038 A1* | 6/2010 | Hajiaghayi | H04L 67/2842 709/203 |
| 2011/0060812 A1* | 3/2011 | Middleton | G06F 17/30902 709/219 |
| 2011/0107030 A1* | 5/2011 | Borst | H04N 21/23106 711/118 |
| 2011/0131341 A1* | 6/2011 | Yoo | G06F 17/30902 709/237 |
| 2011/0271007 A1* | 11/2011 | Wang | H04L 45/306 709/238 |
| 2011/0295983 A1* | 12/2011 | Medved | H04L 45/00 709/220 |
| 2012/0023530 A1* | 1/2012 | Xia | H04N 21/23103 725/93 |
| 2012/0041970 A1* | 2/2012 | Ghosh | G06F 17/30902 707/769 |
| 2012/0072526 A1* | 3/2012 | Kling | H04L 67/06 709/213 |
| 2012/0089700 A1* | 4/2012 | Safruti | H04L 67/2842 709/217 |
| 2012/0096106 A1* | 4/2012 | Blumofe | G06Q 50/00 709/213 |
| 2012/0117240 A1* | 5/2012 | Omar | H04L 29/06 709/226 |
| 2012/0198070 A1* | 8/2012 | Black | H04L 67/16 709/226 |
| 2012/0198075 A1* | 8/2012 | Crowe | H04L 67/2847 709/226 |
| 2012/0254456 A1 | 10/2012 | Visharam et al. | |
| 2012/0278451 A1* | 11/2012 | Han | H04L 67/1008 709/219 |
| 2013/0027416 A1* | 1/2013 | Vaithianathan | G06T 1/60 345/557 |
| 2013/0132544 A1* | 5/2013 | Krishnan | H04L 67/2814 709/223 |
| 2013/0144979 A1* | 6/2013 | Kansal | H04N 21/23106 709/219 |
| 2013/0227168 A1* | 8/2013 | Imai | G06F 15/17312 709/239 |
| 2013/0290465 A1* | 10/2013 | Harrison | G06F 17/30902 709/213 |
| 2013/0326145 A1* | 12/2013 | Shalev | G06F 12/08 711/122 |
| 2014/0082128 A1* | 3/2014 | Beard | H04L 29/08549 709/216 |
| 2014/0089465 A1* | 3/2014 | van Brandenburg | H04L 65/605 709/217 |
| 2014/0108654 A1* | 4/2014 | Zhang | H04L 43/08 709/224 |
| 2014/0149552 A1* | 5/2014 | Carney | H04L 67/32 709/219 |
| 2014/0233740 A1* | 8/2014 | Niamut | H04L 9/3013 380/279 |
| 2014/0280679 A1* | 9/2014 | Dey | H04L 67/2842 709/213 |
| 2014/0280789 A1* | 9/2014 | Swaminathan | H04L 65/4084 709/219 |
| 2014/0282788 A1* | 9/2014 | Inao | H04N 21/23106 725/115 |
| 2014/0344663 A1* | 11/2014 | Joel | G06F 17/2264 715/234 |
| 2014/0359045 A1* | 12/2014 | Mirarchi | H04L 67/2842 709/213 |
| 2014/0365557 A1* | 12/2014 | Maehara | H04L 67/2814 709/203 |
| 2015/0039784 A1* | 2/2015 | Westphal | H04L 45/306 709/240 |
| 2015/0055557 A1* | 2/2015 | Dong | H04W 4/70 370/328 |
| 2015/0063249 A1* | 3/2015 | Jover Segura | H04W 36/12 370/329 |
| 2015/0146722 A1* | 5/2015 | Wainner | H04L 45/742 370/392 |
| 2015/0200992 A1* | 7/2015 | Houdaille | H04L 65/80 709/219 |
| 2015/0207872 A1* | 7/2015 | Stiemerling | H04W 4/18 709/219 |
| 2015/0256581 A1* | 9/2015 | Kolhi | H04L 65/602 709/219 |
| 2015/0256601 A1* | 9/2015 | Mosko | H04L 67/2842 709/213 |
| 2016/0078220 A1* | 3/2016 | Scharf | G06F 21/51 726/1 |
| 2016/0179687 A1* | 6/2016 | Kumar | G06F 12/0891 711/135 |
| 2016/0239431 A1* | 8/2016 | Li | G06F 12/1045 |

\* cited by examiner

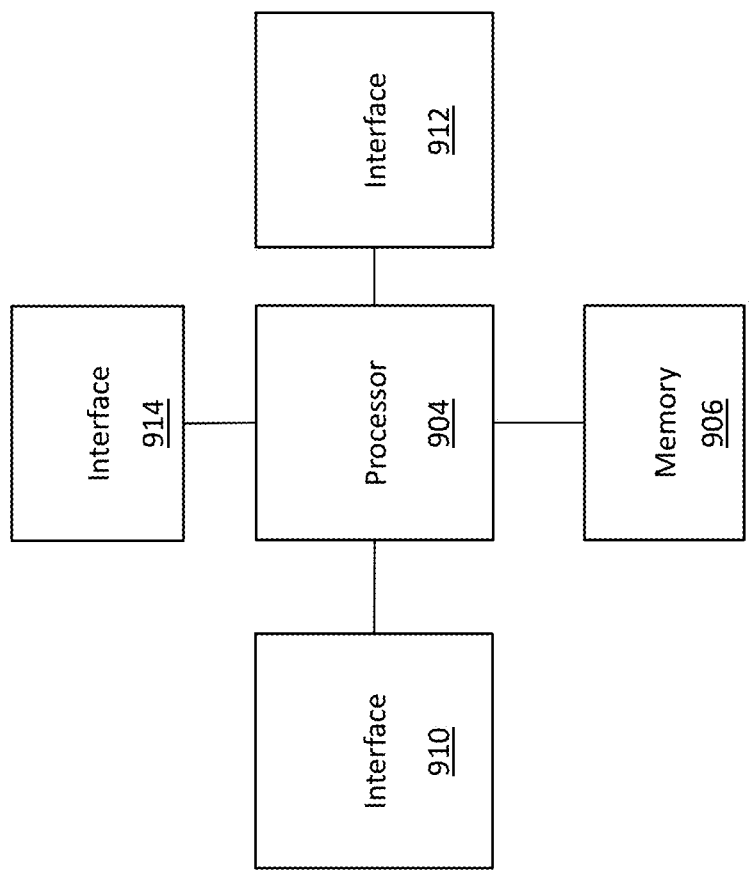

ved. In this example, the method includes building a
DISTRIBUTED CONTENT DISCOVERY FOR IN-NETWORK CACHING

TECHNICAL FIELD

The present invention relates generally to telecommunications, and in particular embodiments, to techniques and mechanisms for distributed content discovery with in-network caching.

BACKGROUND

Modern networks often store and provide content to user devices. For example, the network may contain a movie that a user device such as a phone wishes to view. The content may be originally sourced from a single location within a network, and then temporarily replicated to caches throughout the network. By caching content throughout a network, user devices may have a shorter path to the content, improving performance.

A disadvantage of typical network caching schemes is that client devices are unable to discover the locations of caches. Instead, client devices often simply retrieve pieces of content from a single cache. For example, a network node may configure all devices within its network to store and retrieve content from a single cache. This single cache may not be the nearest location that content is stored relative to the client device. In fact, the content may be buffered in multiple distinct locations (e.g., other client devices, etc.), but because the requesting client device is unaware of those cache locations or the caches' contents, the content is generally retrieved from the single content cache, even if that cache is located further from the requesting device than other distributed caches.

SUMMARY

Technical advantages are generally achieved, by embodiments of this disclosure which describe distributed content discovery for in-network caching.

In accordance with an embodiment of the present invention, a method for deploying cache location services is provided. In this example, the method includes selecting a subset of candidate nodes to provide the cache location services for a content server based on a criteria, and sending a configuration message to nodes in the subset of candidate nodes. The configuration message instructs the nodes in the subset of candidate nodes to maintain cache location tables for content of the content server. An apparatus for performing this method is also provided.

In accordance with another embodiment of the present invention, a method for discovering cached content is provided. In this example, the method includes receiving a query from a requesting device and a stop forwarding condition. The query comprises information requesting caching locations of content reposited in a content server of a network. The query is received by a first node in the subset of candidate nodes maintains a first cache location table. The method further includes forwarding the query to at least one of the subset of candidate nodes configured to maintain cache location tables for the content server if the stop forwarding condition is not satisfied, and stopping the query operation if the stop forwarding condition is satisfied. An apparatus for performing this method is also provided.

In accordance with another embodiment of the present invention, a method for maintaining cache location tables is provided. In this example, the method includes building a cache location table for a content server of a network node. The cache location table identifies distributed cache nodes storing content currently reposited in the content server. The method further includes determining that a first content data has been added to, or removed from, a first distributed cache node, and updating the cache location table to reflect that the first content data has been added to, or removed from, the first distributed cache node. In an embodiment, the first distributed cache node is a user-side device. In an embodiment, the content server is a content distribution network (CDN) node. In an embodiment, determining that the first content data has been added to, or removed from, the first distributed cache node comprises receiving a notification from the first distributed cache node. In an embodiment, determining that the first content data has been added to, or removed from, the first distributed cache node comprises monitoring ingress or egress traffic of the first distributed cache node. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9 illustrates a diagram of an embodiment communications device.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure provide techniques for improving caching performance in a network by enabling discovery of cache locations storing requested content. In some embodiments, cache location service information maps a content server to one or more distributed caches storing content from the content server. The distributed caches may be network-side devices, user-side devices, or other devices/components configured to store content from a content server in a distributed network location. Aspects of this disclosure further provide a cache querying technique that allows a device such as a user device and/or a traffic engineering (TE) controller to dynamically discover cache locations storing desired content, without requiring the devices to have knowledge of all the caches in a network.

Figure 1:
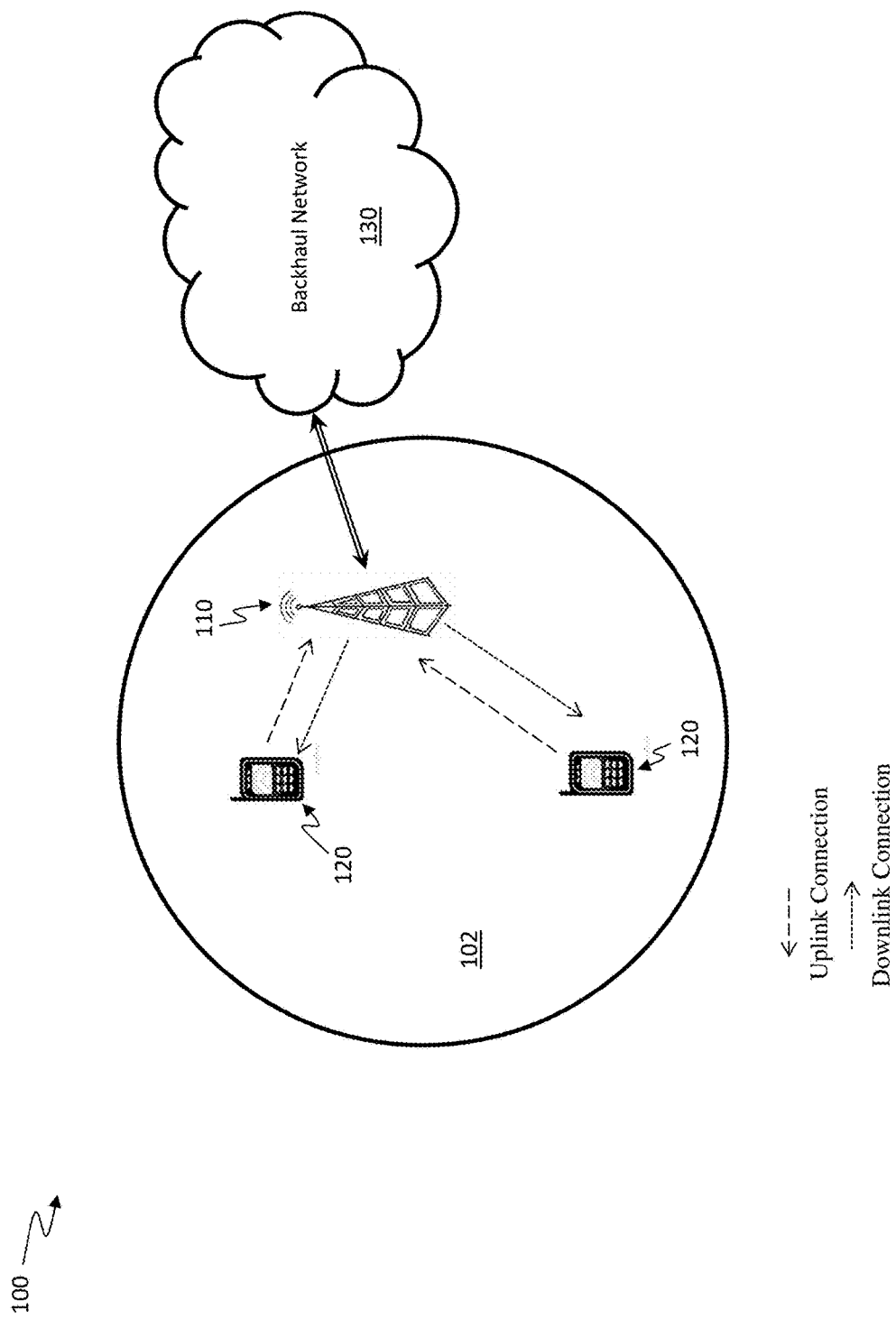
FIG. 1 illustrates a diagram of an embodiment wireless communications network.

FIG. 1 illustrates a network 100 for communicating data. The network 100 comprises a base station 110 having a coverage area 102, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
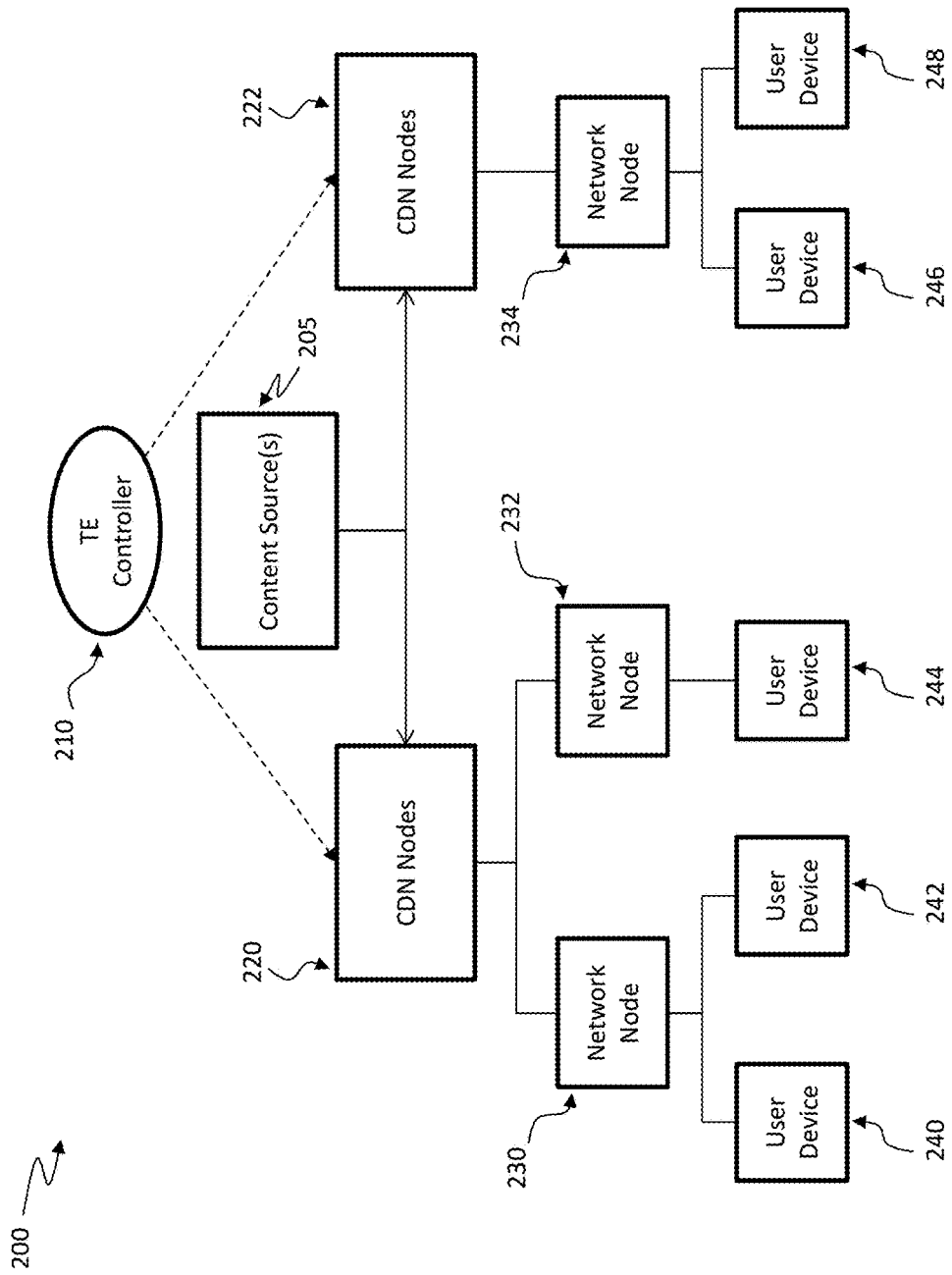
FIG. 2 illustrates a diagram of an embodiment network configured to distribute cached content.

FIG. 2 shows a block diagram of a network 200 configured to store content at distributed network locations. The network 200 may comprise a content source(s) 205, a TE controller 210, content delivery networks (CDN nodes) 220-222, network nodes 230-234, and user devices 240-248. The content source(s) 205 may include any devices that provide content in the network 200. The TE controller 210 computes route and resource allocation for the network 200. The TE controller 210 may discover information about content in the network 200, e.g., locations of distributed content. The TE controller 210 may then use the discovered information to perform multi-source traffic engineering, such as selecting traffic sources and configuring paths for carrying traffic in the network 200, e.g., setting up and maintaining forward tables in data plane entities.

The CDN nodes 220-222 store content provided by the content source(s) 205. The CDN nodes 220-222 may be located throughout the network, e.g., an internet service provider (ISP) may locate a CDN within their infrastructure. In some embodiments, the CDN nodes 220-222 may store content such as videos, images, music, and the like. Additionally, the CDN nodes 220-222 may also store one or more properties associated with content. For example, in an embodiment where the content is a movie, the associated properties may include the genre, year of release, leading actor, and the like. Likewise, in an embodiments where the content is a song, the associated properties may include the artist, album, release date, and the like. When one of the user devices 240-248 desires the content, they may query the network 200 to discover the locations of the content (discussed below).

The network nodes 230-234 are intermediate devices in the network 200. The network nodes 230-234 may be arranged with the user devices 240-248 in a multi-layer topology. For example, the network nodes 230-234 may be a router, modem, switch, or the like. Although the network 200 illustrated in FIG. 2 shows a single tier of the network nodes 230-234, in some embodiments the network 200 may contain several nested tiers of the network nodes 230-234. For example, the network 200 may include a first network node such as an internet gateway, a nested second network node such as a router, and a nested third network node such as a switch.

The user devices 240-248 may comprise devices such as computers, televisions, cellular phones, and the like. During operation, one of the user devices 240-248, e.g. user device 242, may desire content such as a movie, image, or the like. In the illustrated embodiment, the user device 242 may request the content from the TE controller 210. In other embodiments, the user device 242 may request the content from the content source(s) 205, from all or a subset of the CDN nodes 220-222, or from a network component dedicated to responding to content requests; these devices may then forward the content request to the TE controller 210 or to the user device 242. The TE controller 210 may then discover information about content in the network 200, e.g. locations of distributed content. Once discovery of content has been performed, the TE controller 210 may perform multi-source traffic engineering to satisfy the content request from the user device 242, and direct the user device 242 to the desired content. The multi-source traffic engineering may take the discovered locations of distributed content into account, including locations such as the content source(s) 205 and CDN nodes 220-222. For example, during multi-source traffic engineering, the TE controller 210 may select one or more of the CDN nodes 220-222 and/or content sources 205 that is closest to the user device 242 to provide the content to the user device 242. Alternatively, content location information may be provided directly to the user device 242, which may itself discover the content within the network 200 and choose a location to satisfy the content request. Once a content location has been identified, the user device 242 may retrieve the content for consumption.

Figure 3A:
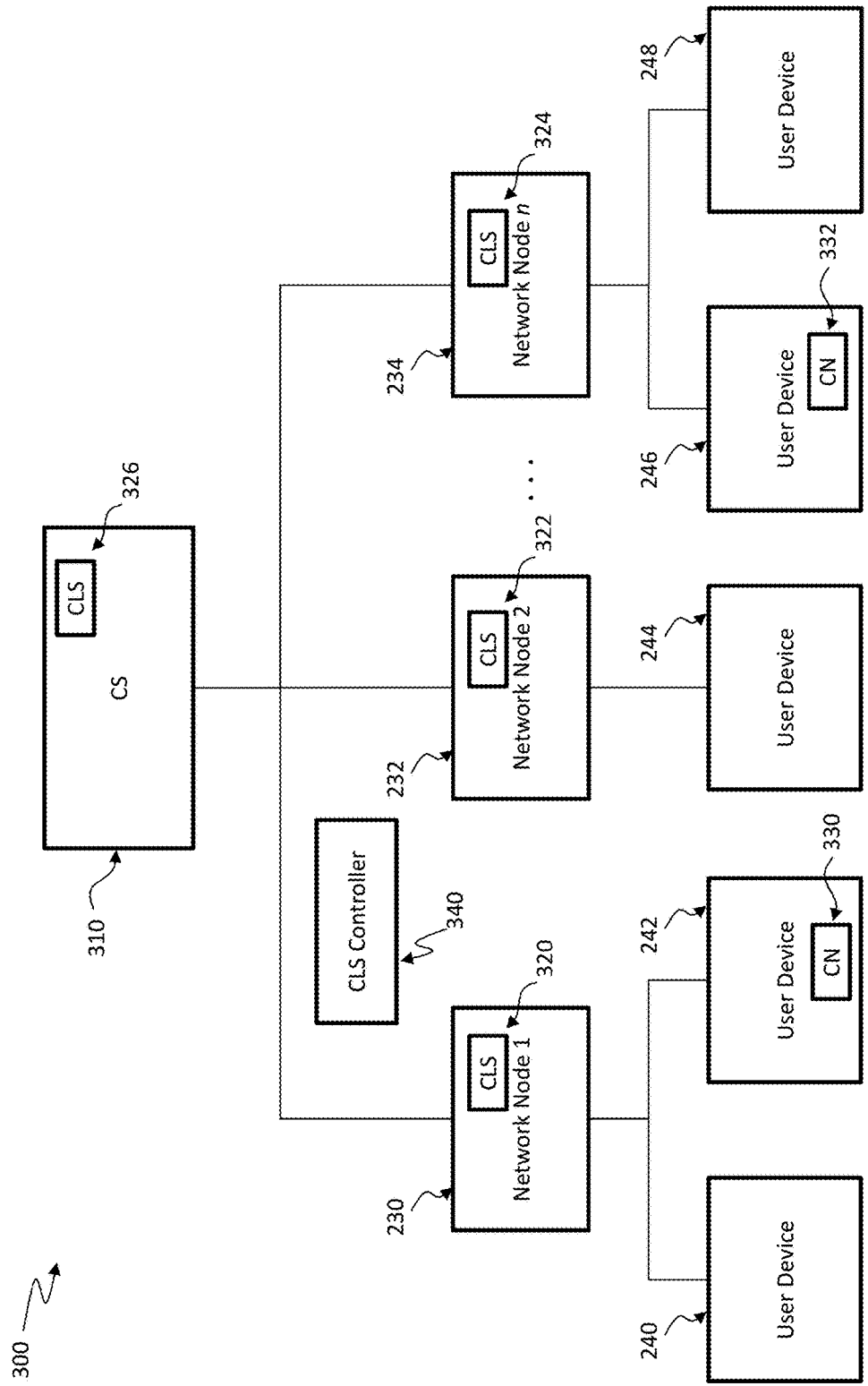
FIGS. 3A and 3B illustrate a diagram of an embodiment network at various stages of configuration.

FIG. 3A illustrates a network 300 in an intermediate stage of configuration. In this stage of configuration, the network 300 may comprise a content server 310, the network nodes 230-234, and the user devices 240-248. The content server 310 stores original copies of content that will be distributed in the network 200, e.g., videos, music, images, and the like. For example, the content server 310 may contain a movie that a user device wishes to view. When requested by one of the user devices, e.g., user device 240, the video may be transmitted from the content server 310 to the user device 240. During content delivery, the desired content may be cached in the network 200 for later distribution. Future requests by other user devices, e.g. user device 242, for the same content may result in the user device 242 being directed to another location where the desired content is distributed within the network 300. The content server 310 may be any device or network suitable for storing a large quantity of content, such as a NAS, a disk array, an iSCSI device, a CDN, or the like. For some situation, at least one of the distributed cache nodes is not a CDN) node, and wherein at least one of the distributed cache nodes is a user-side device.

Caching content from the content server 310 in the network 200 may decrease the load on the content server 310, resulting in an increased performance. Further, caching content in the network 200 may result in desired content being stored in a location in the network that is closer to a user device than the content server 310. This may decrease latency the user devices 240-248 experience when requesting content from the network 200.

In the illustrated embodiment, the user devices 240-248 comprise cache nodes 330-332. The cache nodes 330-332 cache the distributed content stored from the content server 310. For example, a desired piece of content such as a video may be stored on the content server 310. The cache nodes 330-332 may also store copies of the video. The stored copies of the video may be the full video file, or segments of the video file. When another user device desires the video, it may query through the network 300 for the location of the video, and then retrieve it from the cache nodes 330-332 instead of the content server 310.

The cache nodes 330-332 may be user devices or non-user devices. In the illustrated embodiment, one or more of the user devices 240-248 are configured to function as cache nodes. The user devices 240-248 may cache content they previously retrieved from the content server 310 (or other devices), and make the cached content available to other user devices in the network 300 (discussed below). In another embodiment, a cache node may be a standalone device suitable for caching content, such as a file server, a web server, or the like. In yet another embodiment, a cache node may be capable network node, such as a router, base station, or the like.

In the illustrated embodiment, the network nodes 230-234 and the content server 310 maintain cache location service (CLS) tables 320-326. The CLS tables 320-326 are used to identify cache nodes storing content currently reposited in the content server, and each CLS table is used specify which content is stored in each of the cache nodes. The CLS tables 320-326 associate the content server 310 with one or more cache nodes 330-332. For example, a CLS table may store the identifiers of cached content that originated from the content server 310, and may associate those content identifiers with cache nodes 330-332 storing that cached content. In some embodiments, content from the content server 310 may be segmented, and thus the cache location tables may also store segment info for the segmented content. In some embodiments, the cache location tables may also store routing information for the cached content. By virtue of associating the content server 310 with one or more of the cache nodes 330-332, the CLS tables 320-326 can inform users of distributed caching locations that store content being requested by the users.

The CLS tables 320-326 may associate the content server 310 with a subset of the available cache nodes in the network 300. Thus, a set of CLS tables may not necessarily have knowledge of all cache nodes in the network. Likewise, more than one of the network nodes 230-234 may be configured to maintain cache location tables for the content server 310. For example, the CLS tables 320 may be configured to associate the content server 310 with the cache node 330, and the CLS tables 324 may be configured to associate the content server 310 with the cache node 332. In such an embodiment, the CLS tables 320 have no knowledge of cache node 332, and the CLS tables 324 have no knowledge of cache node 330.

The CLS tables 320-326 may be located on network nodes configured to operate as CLS nodes, or on standalone devices operating as CLS nodes. In some embodiments, the network nodes 230-234 may maintain CLS tables. For example, a network node may be a router, a network switch, an internet service provider (ISP) substation, a wireless base station, or the like. The network nodes 230-234 may be configured to operate as CLS nodes in addition to performing their normal networking tasks. In some embodiments, the CLS tables 320-324 may be located on devices configured to function exclusively as CLS nodes. For example, a CLS node may be a dedicated server, a low-power embedded computer system, or the like.

In the illustrated embodiment, the content server 310 may be configured to maintain CLS tables 326. The CLS tables 326 may comprise information about the locations of all the cache nodes that have cached content reposited in the content server 310. In an embodiment, a content server may know the locations of some or all associated cache nodes. In other embodiments, the content server 310 may not maintain the CLS table 326, in which case the server may not know the locations of associated cache nodes. By decoupling the cache location services from the content server 310, cache nodes may be added to or removed from the network without changing the configuration of the content server 310.

A CLS controller 340 configures nodes to maintain CLS tables in the network 300. The CLS controller 340 may identify candidate network nodes, such as the network nodes 230-234 and/or the content server 310, and then configure all or a subset of the identified candidate nodes to maintain the CLS tables 320-326. In the illustrated embodiment (shown in FIG. 3B), the CLS controller 340 configures the network node 230 to maintain the CLS table 320, and the network node 232 to maintain the CLS tables 322. The network nodes 230, 232 may maintain the CLS tables 320, 222 by updating the CLS tables 320, 222 to reflect when new content (e.g., video, etc.) is stored in a new network location. The network nodes 230, 232 may receive update notifications from cache nodes when content is added to, removed from, or modified in the cache nodes. The network nodes 230, 232 may then update the CLS tables 320, 322 to reflect the content addition, deletion, or modification. Different CLS tables may correspond to different regions and/or content being stored in the network. Information in CLS tables may overlap in some implementations, e.g., two CLS tables may indicate that content is stored in same caching node. Selection of the network nodes to maintain CLS tables may include evaluation of parameters such as network performance parameters, network latency parameters, network traffic parameters, and/or the like. The criteria used to select candidate nodes for providing the cache location services may include storage capability, bandwidth constraints, control overhead, connectivity quality (e.g., quality of connection with other selected candidate nodes), and popularity (e.g., how often it is included in a data path between the content server and content consumers). A minimum or maximum number of candidate nodes selected to perform the cache location service may be an input parameter. In some embodiments, there is not explicit limit on the number of candidate nodes selected to perform the cache location service.

Figure 3B:
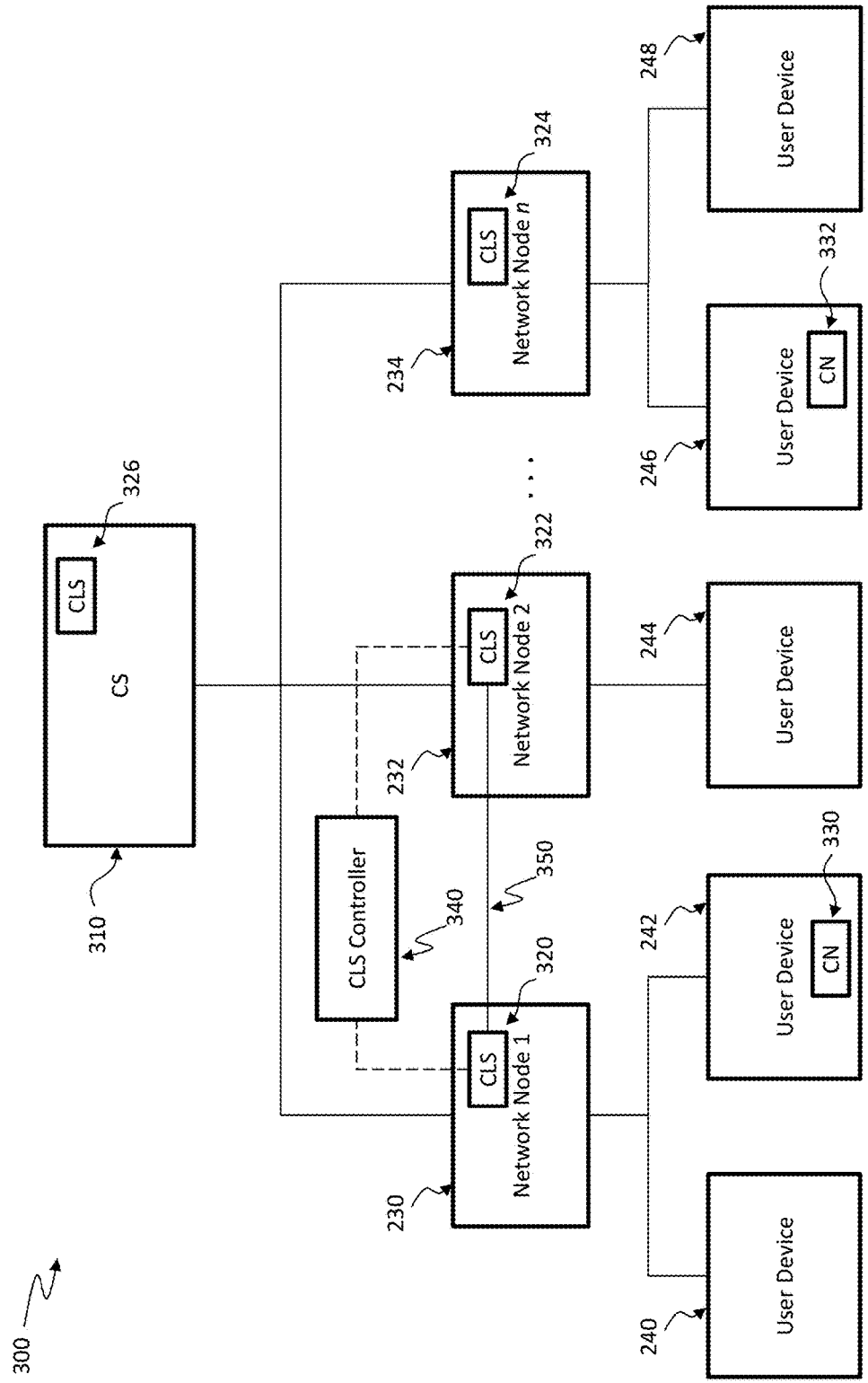

FIG. 3B illustrates the CLS controller 340 configuring the network nodes 230 and 232 to function as CLS tables 320 and 322 in the network 300. A virtual connection 350 is defined between the CLS tables 320 and 322. The virtual connection 350 may be realized by direct physical connections, through bridge nodes, or the like (not shown). The illustrated embodiment shows two network nodes being configured to maintain CLS tables, but other embodiments may include more or less nodes configured to maintain CLS tables. In such embodiments, not all CLS nodes may be interconnected through virtual connections. The use of the virtual connection 350 in the network 300 ensures at least some cache location servers will be virtually connected.

During configuration of the CLS tables 320 and 322, the CLS controller 340 may inform the TE controller 210 of its selection and configuration decisions. The CLS controller 340 may transmit information about the distributed content, such as associations between the content server 310 and the CLS tables 320-324, to the TE controller 210. Information about the configured virtual connection 350 may also be sent to the TE controller 210. The TE controller 210 may then use the information about the distribution and/or layout of content within the network to more efficiently route requests for content through the network 300.

Figure 4:
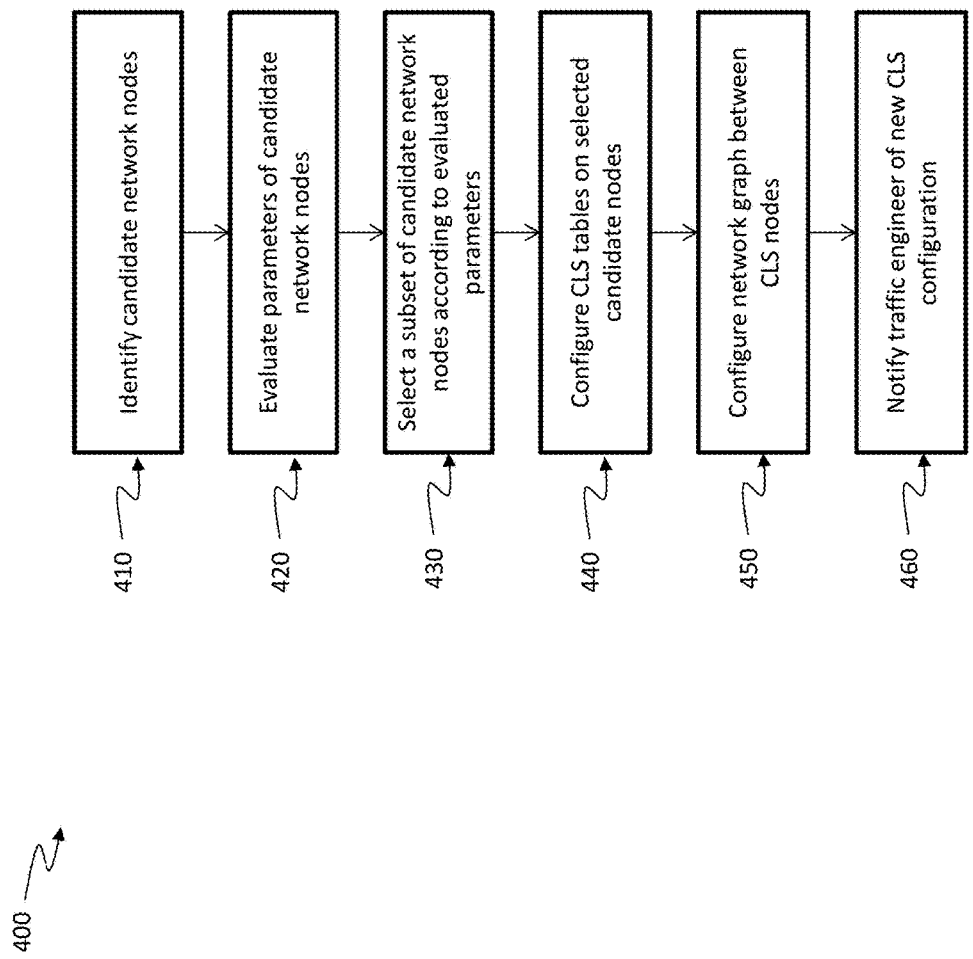
FIG. 4 illustrates an embodiment method of configuring a network to distribute cached content.

FIG. 4 illustrates a flowchart of a method 400 for configuring nodes to maintain and update CLS tables in a network. The method 400 begins with step 410, where a CLS controller identifies candidate nodes in a network that are capable of providing cache location services. The method 400 continues with step 420, where the CLS controller evaluates performance parameters of the candidate network nodes. The method 400 continues with step 430, where the CLS controller selects a subset of the candidate network nodes in accordance with evaluated parameters. As referred to herein, a "subset of the candidate nodes" may include all candidate nodes, or fewer than all candidate network nodes, in a network. The method 400 continues with step 440, where the selected network nodes are configured to maintain CLS tables. The method 400 continues with step 450, where virtual connections are defined between the configured CLS nodes. Optionally, the method 400 concludes with step 460, where the TE controller is notified of the newly configured CLS nodes.

Figure 5:
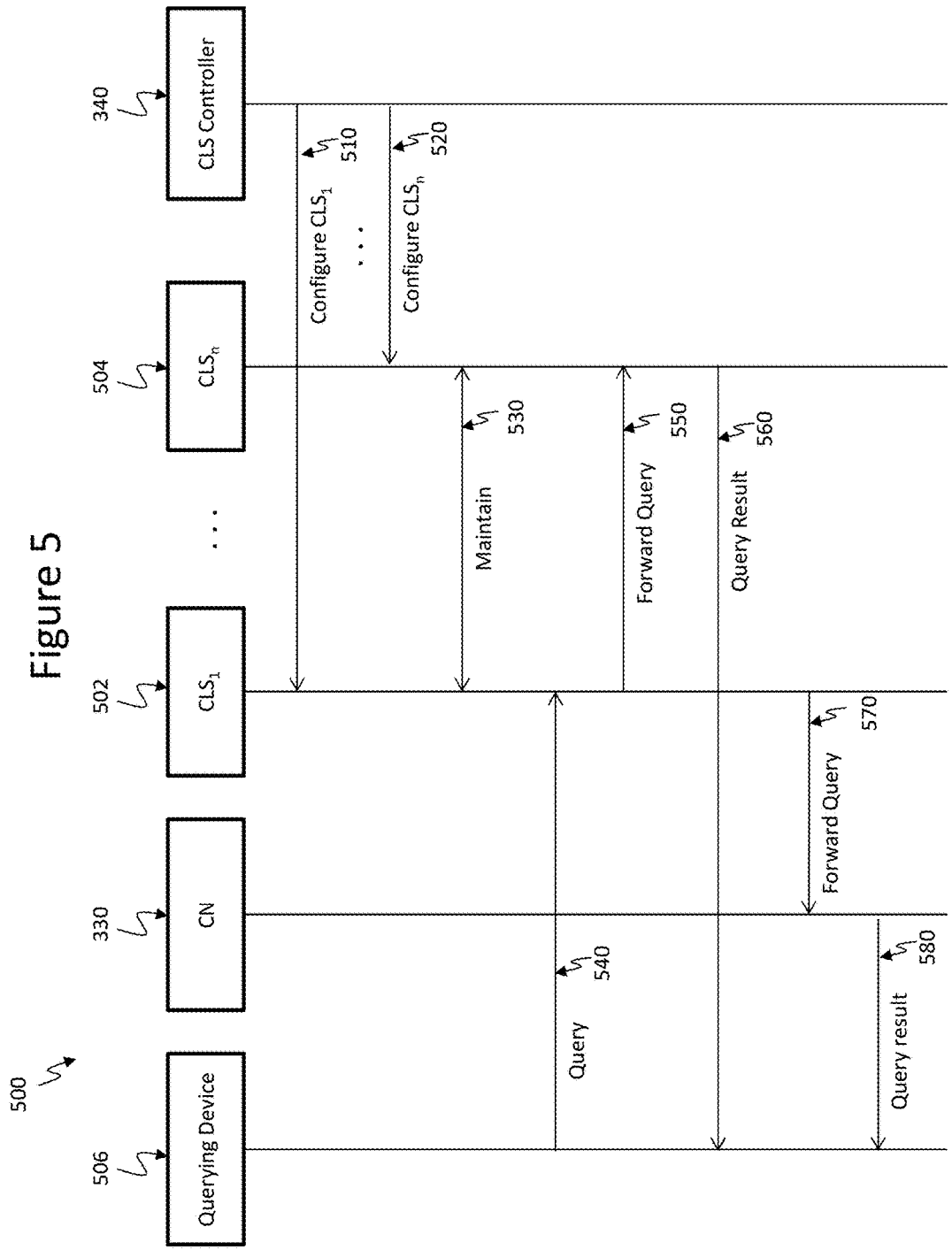
FIG. 5 illustrates a protocol diagram of an embodiment communications sequence for querying CLS information.

FIG. 5 illustrates a protocol diagram of an embodiment communications sequence 500 for configuring and querying CLS nodes 502-504. As shown, the CLS controller 340 sends configuration messages 510-520 to the CLS nodes 502-504. One configuration message may be sent to each configured CLS node, e.g., configuration message 510 is sent to CLS node 502. The configuration messages 510-520 may include information instructing the CLS nodes 502-504 to form a logical topology. The logical topology may define logical interconnections between the CLS nodes 502-504, as well as define relative topological properties of the CLS nodes 502-504 (e.g., whether the CLS nodes 502-504 reside on a 3-hop ring, a 2-hop ring, etc. Information for maintaining and/or updating the topological configuration/properties of the CLS nodes 502-504 may also be piggybacked on subsequent configuration maintenance messages.

In some embodiments, not all CLS nodes will be configured in a network. In embodiments where a network has more than one CLS node configured, the CLS nodes 502-504 maintain the status of their cached content with maintenance messages 530. In some embodiments, the CLS nodes 502-504 may have inconsistent information about the status of their stored content caches, and thus no maintenance messages 530 may be exchanged among them. In other embodiments, a network may have only one CLS node configured, and thus no maintenance messages 530 may be exchanged.

In the illustrated embodiment, a querying device 506 queries for a desired content by sending a query 540 to the CLS node 502. The querying device 506 may be any device on the network, such as a user device, a TE controller, and/or the like. The CLS node 502 may forward the query to other CLS nodes in the network, e.g., CLS node 504, by sending a forward query message 550. In some embodiments, the query 540 and/or the forward query 550 may include embedded information pertaining to query forwarding. For example, a stop forwarding condition may be embedded in the query, and the candidate nodes may be configured to cease forwarding the query when the stop forwarding condition is satisfied. Alternatively, the stop forwarding condition can be received separately from a requesting device or network controller. In an embodiment, the stop forwarding condition comprises a time to live condition, such as maximum hop count or depth value for forwarding the query. As another example, forwarding rules may be embedded in the query, and the candidate nodes may forward the query in accordance with the forwarding rules embedded in the query. In an embodiment, the forwarding rules instruct at least some candidate nodes in the subset of candidate nodes to forward the query on a path. The path may be explicitly defined in the query. Alternatively, the path may be implicitly referenced, for example, by limiting the path to an arc having a degree (e.g., specified by the query) on the logical ring that the forwarding node resides on.

Some CLS nodes may respond directly to the user device with a query result containing the location of a cache node storing the desired content. In the illustrated embodiment, the CLS node 504 responds to the querying device 506 with a query result 560.

Some CLS nodes may forward the query to a cache node listed in their cache location table, and those cache nodes may then respond to the user device. In the illustrated embodiment, the CLS node 502 forwards the query to the cache node 330 via a forward query message 570. When the cache node 330 node receives the query, it checks to see if the desired content is cached. If the cache node 330 has the desired content, it replies to the querying device 506 with a query result 580. Once the querying device 506 receives the query results 560 and 580 it selects a cache from the query results, e.g., the cache node 330, to service a content request.

Figure 6:
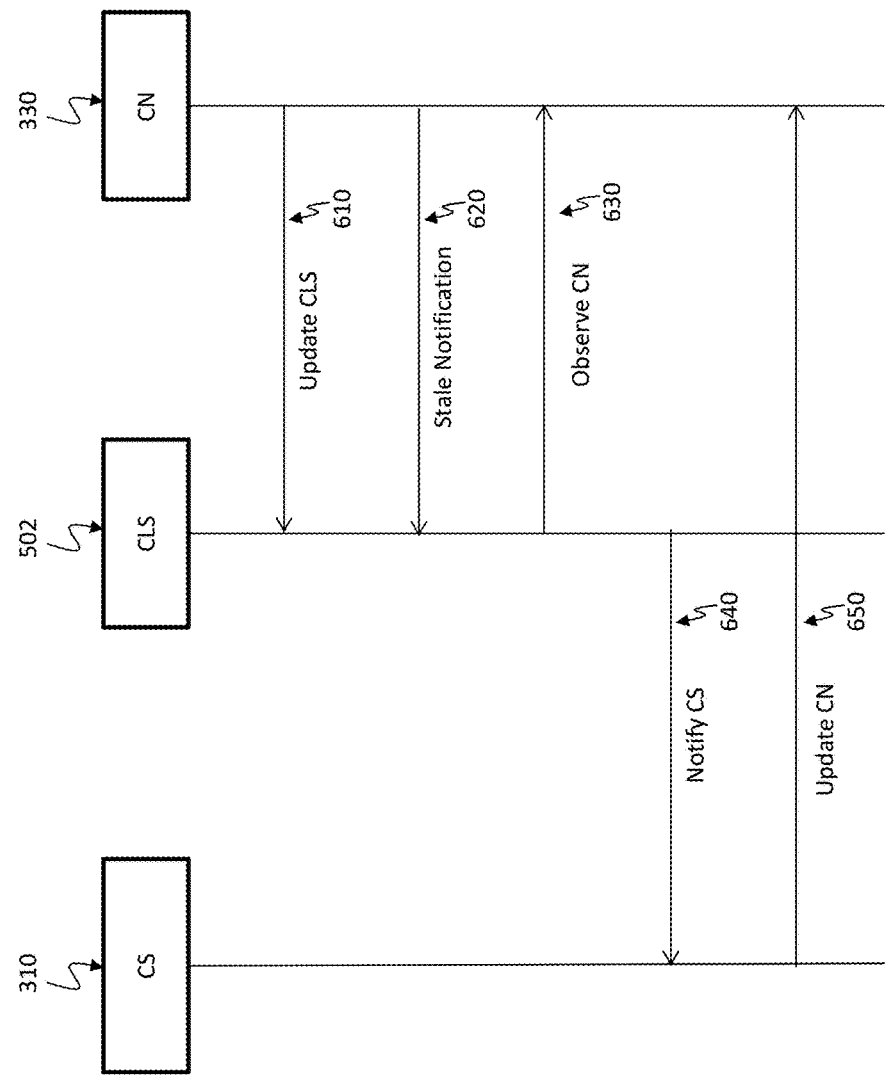
FIG. 6 illustrates a protocol diagram of an embodiment cache update sequence.

FIG. 6 illustrates a protocol diagram of an embodiment cache update communications sequence. There are several situations in which the CLS node 502 may need to have information about the cache node 330 updated. The CLS node 502 may need to be updated when content is added to, or removed from, the cache node 330. For example, the CLS node 502 may be notified when content is cached in the cache node 330, e.g., after being provided to a user device. Likewise, the CLS node 502 may also be notified when cached content is dropped or removed from the cache node 330. The cache node 330 may notify the CLS node 502 of caching or removal of content via an update message 610. The update message 610 may contain an identifier corresponding to the cache node 330, an identifier corresponding to the cached content, and a field indicating whether the content has been cached in, or removed from, the cache node 330. In some embodiments, the update message 610 may also contain an identifier corresponding to the content server 310. In embodiments where content is segmented, any segment information about the content may also be included in the update message 610.

Content cached in the cache nodes 330-332 may become "stale" over time, e.g., the content on the content server 310 may change, causing the content cached in the cache nodes 330-332 to become out of date. This stale content may be updated and/or removed from stale cache nodes so that user devices are not accidently served invalid content. The CLS node 502 coordinates the detecting and updating of stale cache information between the content server 310 and the cache node 330.

In some embodiments, the cache node 330 may send the update message 610 when it has cached new content after a content request. The newly cached content in the cache node 330 may be a full piece of content, or segments of desired content. In other embodiments, the update message 610 may be sent when the cache node 330 deletes reposited cached content. In some embodiments, there may be more than one CLS node configured for a content server 310, and the update message 610 may be sent to all configured CLS nodes or a subset of the configured CLS nodes, which in some embodiments may then forward the update message 610 to other configured CLS nodes.

A monitoring component may detect stale cache information. In the illustrated embodiment, the monitoring component is co-located within the CLS node 502. In other embodiments, the monitoring component may be another device such as a user device. Stale cache information may be detected in several ways. In some embodiments, the cache node 330 may issue an explicit stale notification 620 to the CLS node 502. In other embodiments, the CLS node 502 may perform observation 630 to observe the cache node 330 for lack of responses to cache requests. A lack of responses by the cache node 330 may indicate to the CLS node 502 that the cache is stale. Once the CLS node 502 has been notified that the cache node 330 is stale, it then notifies the content server 310 with a notification message 640. The CLS node 502 may then update its cache information by removing stale cache entries from its cache location tables. Upon later requests for content, the latest version of desired content may then be transmitted to the cache node 330 with an update message 650. In some embodiments, the update message 650 may include a differential update, such that it indicates differences between the updated and stale content without carrying redundant information common to both the new and redundant content.

Figure 7:
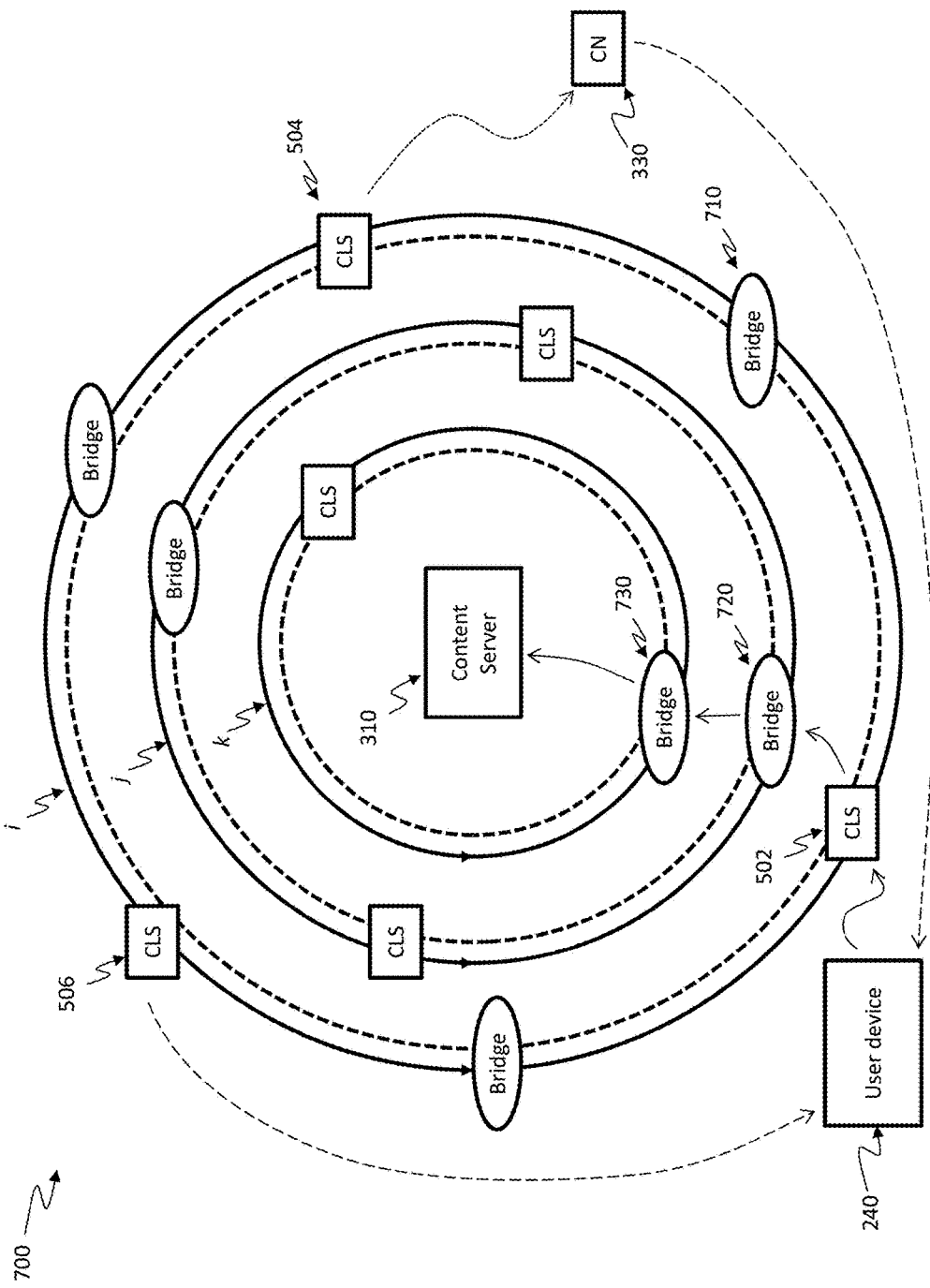
FIG. 7 illustrates a diagram of an embodiment network querying for cached content.

FIG. 7 illustrates an embodiment ring network 700 comprising a user device 240 querying for locations of a desired content. The ring network 700 may comprise the virtual ring network between CLS nodes, independent of the physical network topology. The embodiment ring network 700 has network nodes on each topological level configured to function as CLS nodes. For example, a topological level k has two network nodes: one is configured to function as a CLS node, and the other is configured to function as a bridge node to other CLS nodes in topological levels i and j. In the illustrated embodiment, the user device 240 is located in the topological level i, knows the identifier associated with the desired content, and knows that the desired content is originally located on the content server 310. The user device 240 may learn this information in a variety of ways, e.g., by examining each content server in a network to determine which content server reposits the desired content.

Once the user device 240 knows the desired content is reposited on the content server 310, it may send (e.g., broadcast or otherwise) a cache location query to the ring network 700 in order to determine the identities of network nodes that the desired content is cached in. A cache location query may comprise an identifier associated with the content, and may optionally include an identifier associated with the content server 310. The user device 240 may begin querying by sending the cache location query to a network node located in the same topological level i as the user device 240, e.g., the CLS node 502. The CLS node 502 may check its cache location table for the location of the desired content, and then forward the cache location query to another network node in the same level of network topology, such as a bridge 710. Because the bridge 710 is not configured to function as a CLS node, it may forward the cache location query to CLS node 504, which is the next network node in the topological level i.

In some embodiments, the CLS node 504 may have an entry for the desired content in its cache location table. If so, the CLS node 504 may reply directly to the user device 240. In some embodiments, the CLS node 504 may send the cache location query to the cache node 330. If the cache location query is sent to the cache node 330, the cache node 330 may then reply to the user device 240, indicating the identity of the cache node 330 and the presence of the desired content. Once the CLS node 504 responds to the cache location query or sends it to the cache node 330, the CLS node 504 may forward the cache location query to other network nodes on the topological level i. The cache location query may continue to be forwarded around the topological level i of the network until a criteria is met, e.g., a max number of hops are performed, the cache location query reaches a CLS node (e.g., querying device 506) storing an entry for the desired content in its cache location tables, a full circle is made around the network ring, etc. The CLS node may reply directly to the user device 240, indicating the identity of the cache node 330 and the presence of the desired content.

In some embodiments, the CLS node 502 may forward the cache location query to a network node on a next level of network topology, such as a bridge 720 in the topological level j. The cache location query may continue being forwarded around the topological level j and to higher levels, e.g., a bridge 730 in the topological level k, until it reaches the content server 310. The content server 310 may then directly respond to the user device 240 with the desired content. As discussed above, when the content server 310 directly responds to the user device 240, the content may then be cached in a cache node on the network, e.g., cache node 330.

While the embodiment illustrated in FIG. 7 shows a query being forwarded from lower levels towards the content server 310, e.g., from topological level i to topological level k, queries may also originate from other devices in other levels, and propagate in other directions. For example, a device such as a TE controller residing in topological layer k may send a query that is forwarded away from the content server 310, and down to topological levels j and i. Or, a device such as a user device residing in topological layer j may send a query that is forwarded both towards and away from the content server 310, e.g., up to topological layer k and down to topological layer i.

In some embodiments, the cache location query may be configured such that network nodes stop forwarding it after it traverses a certain quantity of topological layers. For example, the cache location query may be configured to stop after traversing one topological layer, and thus may only propagate through topological levels i and j. In other embodiments, the cache location query may be configured to stop when it is a certain quantity of topological layers away from the content server 310. Other parameters could be used to limit how many topological levels the message may propagate across. By forwarding the cache location query among network nodes in the a topological level and to higher and/or lower topological levels, the cache location query is more likely to reach at least some of the CLS nodes.

As discussed above with respect to FIG. 6, the cache node 330 may need to update CLS nodes in the network, e.g., the CLS node 504, when content is added to, removed from, or updated in the cache node 330. The cache node 330 may broadcast a cache update message to the ring network 700.

The cache update message may be broadcasted and propagated through the network in a similar manner to the cache location query, as discussed above. In some embodiments, the cache update message may not generate a reply from the content server 310 or the CLS nodes.

Figure 8:
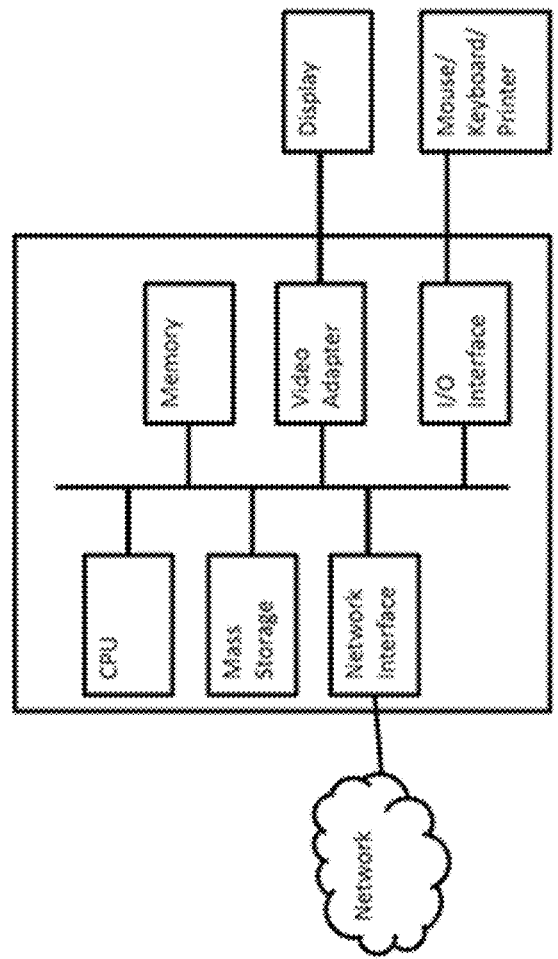
FIG. 8 illustrates a diagram of an embodiment computing platform.

FIG. 8 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

FIG. 9 illustrates a block diagram of an embodiment of a communications device 900, which may be equivalent to one or more devices (e.g., UEs, NBs, etc.) discussed above. The communications device 900 may include a processor 904, a memory 906, a cellular interface 910, a supplemental interface 912, and a backhaul interface 914, which may (or may not) be arranged as shown in FIG. 9. The processor 904 may be any component capable of performing computations and/or other processing related tasks, and the memory 906 may be any component capable of storing programming and/or instructions for the processor 904. The cellular interface 910 may be any component or collection of components that allows the communications device 900 to communicate using a cellular signal, and may be used to receive and/or transmit information over a cellular connection of a cellular network. The supplemental interface 912 may be any component or collection of components that allows the communications device 900 to communicate data or control information via a supplemental protocol. For instance, the supplemental interface 912 may be a non-cellular wireless interface for communicating in accordance with a Wireless-Fidelity (Wi-Fi) or Bluetooth protocol. Alternatively, the supplemental interface 912 may be a wireline interface. The backhaul interface 914 may be optionally included in the communications device 900, and may comprise any component or collection of components that allows the communications device 900 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for deploying cache location services, the method comprising:
    selecting, by a controller, a subset of candidate nodes to provide the cache location services for a content server based on a criteria; and
    sending, by the controller, a configuration message to nodes in the subset of candidate nodes, wherein the configuration message instructs the nodes in the subset of candidate nodes to maintain distributed cache location tables for content of the content server, the nodes in the subset of candidate nodes comprising a first node and a second node different from the controller, wherein a first cache location table of the distributed cache location tables maps a first segment of the content to a first set of one or more cache locations, and a second cache location table of the distributed cache location tables maps a second segment of the content to a second set of one or more cache locations, the first segment of the content and the second segment of the content comprising at least one piece of the content, and the first set of one or more cache locations and the second set of one or more cache locations identifying a same content node storing the at least one piece of the content.

2. The method of claim 1, wherein the configuration message further comprises information to indicate a logical topology.

3. The method of claim 2, wherein the logical topology defines logical interconnections between the subset of candidate nodes or relative topological properties of the subset of candidate nodes.

4. The method of claim 1, wherein the distributed cache location tables identify cache nodes storing content currently reposited in the content server.

5. The method of claim 1, before selecting the subset of candidate nodes further comprising:
identifying, by the controller, the candidate nodes in a network based on a rule; and
receiving, by the controller, a message including information of the selected subset of candidate nodes from a network entity.

6. The method of claim 1, further comprising:
sending, by the controller, a message to a traffic engineering controller, the message indicating that the subset of candidate nodes are maintaining cache location tables for content of the content server.

7. The method of claim 1, wherein the criteria comprises at least one of the following:
an available bandwidth of the candidate nodes, available storing space of the candidate nodes, network loads on the candidate nodes, or cost of maintaining cache location tables at the candidate nodes.

8. The method of claim 1, wherein the configuration message instructs the subset of candidate nodes to associate content identifiers or content segment information with cache identifiers in the distributed cache location tables.

9. The method of claim 1, wherein the configured message comprises at least one of the following:
a list of at least some of the subset of candidate nodes; or
a list of two or more content servers.

10. The method of claim 1, wherein logical interconnections between the subset of candidate nodes are configured to transport content discovery messages between the subset of candidate nodes during content cache discovery, and wherein the logical interconnections are configured to transport cache location table maintenance messages between the subset of candidate nodes when information of a content cache is added, deleted, or updated in a cache location table.

11. An apparatus comprising:
a processor; and
a non-transitory computer readable storage medium storing programming for execution by the processor, the programming including instructions to:
select a subset of candidate nodes to provide cache location services for a content server based on a criteria; and
send a configuration message to nodes in the subset of candidate nodes, wherein the configuration message instructs the nodes in the subset of candidate nodes to maintain distributed cache location tables for content of the content server, the nodes inn the subset of candidate nodes comprising a first node and a second node different from the apparatus, wherein a first cache location table of the distributed cache location tables maps a first segment of the content to a first set of one or more cache locations, and a second cache location table of the distributed cache location tables maps a second segment of the content to a second set of one or more cache locations, the first segment of the content and the second segment of the content comprising at least one piece of the content, and the first set of one or more cache locations and the second set of one or more cache locations identifying a same content node storing the at least one piece of the content.

12. A method for discovering cached content, the method comprising:
receiving, by a first node in a subset of candidate nodes, a query from a requesting device and a stop forwarding condition, the query comprising information requesting caching locations of content reposited in a content server of a network, wherein the first node in the subset of candidate nodes maintains a first cache location table, wherein the first cache location table maps at least a segment of the content to one or more content nodes;
forwarding, by the first node in the subset of candidate nodes based on the first cache location table maintained by the first node, the query to at least one of the subset of candidate nodes configured to maintain distributed cache location tables for the content server if the stop forwarding condition is not satisfied, wherein the at least one of the subset of candidate nodes is different than the content server; and
stopping, by the first node in the subset of candidate nodes, further query operation if the stop forwarding condition is satisfied.

13. The method of claim 12, wherein receiving a stop forwarding condition comprises:
receiving, the stop forwarding condition from the requesting device.

14. The method of claim 12, wherein receiving a stop forwarding condition comprises:
receiving, the stop forwarding condition from a network controller.

15. The method of claim 12, wherein the stop forwarding condition comprises at least one of the following:
query lifetime, query width, or query depth.

16. The method of claim 12, wherein a stop forwarding condition is embedded in the query, and wherein candidate nodes in the subset of candidate nodes are configured to cease forwarding the query to further candidate nodes in the subset of candidate nodes when the stop forwarding condition is satisfied.

17. The method of claim 12, wherein forwarding rules are embedded in the query, and wherein candidate nodes in the subset of candidate nodes are configured to forward the query to further candidate nodes in the subset of candidate nodes in accordance with the forwarding rules embedded in the query.

18. The method of claim 17, wherein the forwarding rules instruct candidate nodes in the subset of candidate nodes to forward the query on a path.

19. The method of claim 12, wherein a query response identifying cache nodes storing the requested content is transmitted to the requesting device.

20. The method of claim 19, wherein the query response prompts the requesting device to retrieve the requested content from one of the cache nodes storing the requested content.

21. The method of claim 12, wherein the query comprises a content identifier and a content server identifier.

22. The method of claim 12, wherein the query is forwarded over virtual connections extending between network nodes configured to maintain the distributed cache location tables.

23. An apparatus in a subset of candidate nodes, the apparatus comprising:
a processor; and
a non-transitory computer readable storage medium storing programming for execution by the processor, the programming including instructions to:
receive a query from a requesting device, the query requesting caching locations of content reposited in a content server of a network from a requesting device, wherein the apparatus in the subset of candidate nodes maintains a first cache location table, wherein the first cache location table maps at least a segment of the content to one or more content nodes;

determine whether the first cache location table identifies a caching location storing the requested content;

forward, based on the first cache location table maintained by the apparatus, the query to at least one of the subset of candidate nodes configured to maintain distributed cache location tables for the content server if the first cache location table does not identify at least one cache location storing the requested content, wherein the at least one of the subset of candidate nodes is different than the content server; and send a query response to the requesting device if the first cache location table identifies one or more cache locations storing the requested content, wherein the query response indicates the one or more cache locations storing the requested content.

24. The method of claim 12, wherein the forwarding comprises forwarding the query to the at least one of the subset of candidate nodes identified by at least one cache location of the first cache location table.

25. The method of claim 1, wherein the first segment of the content is different from the second segment of the content.

* * * * *